US012627156B2

(12) United States Patent
Hart et al.

(10) Patent No.: US 12,627,156 B2
(45) Date of Patent: May 12, 2026

(54) METHOD AND CONTROLLER FOR CONTROLLING A POWER CONVERTER CONNECTED TO A GRID

(71) Applicant: GE Infrastructure Technology LLC, Greenville, SC (US)

(72) Inventors: Philip Joseph Hart, Niskayana, NY (US); Hanchao Liu, Niskayana, NY (US); Atinuke Ademola-Idowu, Niskayana, NY (US); Matias Uolevi Berg, Pirkanmaa (FI); Krishnakumar Raman Vasudevan, Bengaluru (IN)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/947,486

(22) Filed: Nov. 14, 2024

(65) Prior Publication Data

US 2025/0175010 A1 May 29, 2025

(30) Foreign Application Priority Data

Nov. 24, 2023 (EP) .................................... 23212105

(51) Int. Cl.
  *H02J 3/44* (2026.01)
  *H02J 3/38* (2006.01)
(52) U.S. Cl.
  CPC ................ *H02J 3/44* (2013.01); *H02J 3/381* (2013.01)
(58) Field of Classification Search
  CPC ....................................................... H02J 3/44
     (Continued)

(56) References Cited

U.S. PATENT DOCUMENTS 10,756,536 B2 * 8/2020 Kral .......................... H02J 3/18
2023/0369865 A1 11/2023 Hart et al.
    (Continued)

FOREIGN PATENT DOCUMENTS

CN     115459292 A    12/2022
CN     116436091 A    7/2023
      (Continued)

OTHER PUBLICATIONS

Extended European Search Report issued in EP Application No. 23212105.3 dated Jun. 27, 2024, 9 pages.

*Primary Examiner* — Joseph Chang
(74) *Attorney, Agent, or Firm* — Eversheds Sutherland (US) LLP

(57) ABSTRACT

A method for controlling a power converter connected to a grid, wherein the power converter is initially controlled in a grid-forming mode to output current at a nominal voltage, based on control data provided by a controller. The method includes determining that a first parameter exceeds a first threshold. Then: controlling the power converter in a first limiting mode, by limiting the power converter output current based on a present value and/or a reference value; and determining the output current of the power converter. Responsive to determining that the output current is reaching an equilibrium condition: determining a virtual impedance for the power converter; modifying the control system based on the virtual impedance; and controlling the power converter in a constrained grid-forming mode, including the modified control system determining the control data based on measured signals indicative of currents and/or voltages downstream from the power converter, and a reference signal.

15 Claims, 8 Drawing Sheets

(58) Field of Classification Search
USPC ......................................................... 307/151
See application file for complete search history.

(56) References Cited

U.S. PATENT DOCUMENTS

2024/0204533 A1* 6/2024 Ferdowsi ................. H02J 3/388
2024/0305226 A1* 9/2024 Gross ........................ H02J 3/46

FOREIGN PATENT DOCUMENTS

| CN | 117096944 A | 11/2023 |
| WO | 2021029313 A1 | 2/2021 |
| WO | 2023117004 A1 | 6/2023 |

* cited by examiner

METHOD AND CONTROLLER FOR CONTROLLING A POWER CONVERTER CONNECTED TO A GRID

TECHNICAL FIELD

The present invention relates to a method and a controller for controlling a power converter connected to a grid, and more particularly for controlling the power converter by using a virtual impedance.

BACKGROUND

In power transmission networks, DC power is converted to AC power where it is necessary to interconnect DC and AC networks. In any such power transmission network, power conversion means, also known as converters, power converters, inverters, power inverters, or power-electronics based resources, are required at each interface between AC and DC power to effect the required conversion from AC to DC or from DC to AC.

When converting DC power to AC power, for example, at an interface between a DC transmission line and a grid, a power converter may be operated in a grid-following mode (GFL) or a grid-forming mode (GFM).

In the GFL mode, the power converter utilizes fast current-regulation loops to control active and reactive power exchanged with the grid, achieving relatively constant active and reactive power exchange in a sub-transient to transient timescale (e.g., between approximately 10 ms and 150 ms). The power converter uses a current reference for the active component of current to achieve a desired active power output. A power converter operating in a GFL mode includes functions that manage the voltage and/or reactive power in a manner that results in a command for the reactive component of current. Wide-bandwidth current regulators then develop commands for voltage to be applied by the power converter to the grid, such that the actual currents closely track the commands. A power converter operating in a GFL mode therefore provides a current-source characteristic in the sub-transient to transient timescale.

Alternatively, a power converter operating in a GFM mode provides a voltage-source characteristic in the sub-transient to transient timescale, where the phase angle and magnitude of the voltage are controlled to remain mostly static in this timescale to achieve the regulation functions demanded by the grid. With this structure, current will flow according to the demands of the grid while the converter contributes to establishing a voltage and frequency for the grid.

A power converter operating in a GFM mode is thus distinct from a power converter operated in a GFL mode, because the GFM mode regulates, in the sub-transient timescale (e.g., <150 ms), the AC voltage and frequency of the power converter instead of AC current. However, if a fault event occurs in the grid, or other severe grid disturbance, herein referred to as a "grid event", it is possible that the power converter will experience a current, power, or energy overload, because the power converter is regulating voltage and not current, power or energy. This overload can cause the power converter operating in a GFM mode to trip offline, or, in a worst-case scenario, damage the semiconductor devices within the power converter and indefinitely render the power converter inoperable.

During such a grid event, self-protection of the power converter is to be ensured, and current limiting is typically achieved via switching the control to a GFL mode. However, under some conditions, switching the control mode in such a manner has the potential to jeopardize the stability of the power converter and the stability of the overall power system.

SUMMARY OF THE INVENTION

In light of these considerations and emerging grid requirements, it is desired to develop methods that allow the power converter to retain some semblance of GFM behaviour while operating close to (but not exceeding) hardware limits.

According to a first aspect, there is provided a method for controlling a power converter connected to a grid, wherein the power converter is initially controlled in a grid-forming mode to output current at a nominal voltage, based on control data provided by a controller, the controller comprising a control system which determines the control data based on measured signals indicative of currents and/or voltages downstream from the power converter, and a reference signal. The method comprises determining, by the controller, that a first parameter related to the controller and/or the power converter exceeds a first threshold. Responsive to determining that the first parameter exceeds the first threshold: controlling, by the controller, the power converter in a first limiting mode, by limiting the power converter output current based on a present value and/or a reference value; and determining, by the controller, the output current of the power converter. Responsive to determining that the output current is at or is close to an equilibrium condition: determining, by the controller, a virtual impedance for the power converter based on the output current of the power converter; modifying, by the controller, the control system based on the virtual impedance; and controlling, by the controller, the power converter in a first constrained grid-forming mode, comprising the modified control system determining the control data based on measured signals indicative of currents and/or voltages downstream from the power converter, and a reference signal.

Determining that the output current is at or is close to an equilibrium condition may comprise determining that the output current is within a predefined threshold of an equilibrium condition. The predefined threshold may be application dependant.

In some embodiments, the reference signal contains a voltage reference provided by a grid-forming controller.

In some embodiments, the controller comprises a grid-forming controller.

In some embodiments, determining the output current of the power converter comprises estimating the output current.

In some embodiments, determining the output current of the power converter comprises measuring the output current.

In some embodiments, determining the output current of the power converter comprises using a reference for the output current.

In some embodiments, the virtual impedance is a fixed or a static virtual impedance. This means that the determined value of the virtual impedance does not change during the constrained grid-forming mode.

In some embodiments the method further comprises determining, by the controller, that a second parameter related to the controller and/or the power converter exceeds a second threshold. Responsive to determining that the second parameter exceeds the second threshold: controlling, by the controller, the power converter in a second limiting mode, by limiting the power converter output current based on an updated present value and/or an updated reference value; and determining, by the controller, an updated output current of the power converter. Responsive to determining that the updated output current is at or is close to an equilibrium condition: determining, by the controller, an updated virtual impedance for the power converter based on the updated output current of the power converter; further modifying, by the controller, the control system based on the updated virtual impedance; and controlling, by the controller, the power converter in a second constrained grid-forming mode, comprising the further modified control system determining the control data based on the measured signals indicative of currents and/or voltages downstream from the power converter, and the reference signal.

By determining that a second parameter related to the controller and/or the power converter exceeds a second threshold, and subsequently controlling the power converter in a second constrained grid-forming mode, an iterative control process can be established wherein a parameter that exceeds a threshold causes the power converter to be controlled in a further constrained mode. Accordingly, there is no limit to the number of parameters that may be determined to exceed a threshold, and subsequently there is no limit to the number of constrained grid-forming modes.

In some embodiments the control system is a cascaded control system including a voltage controller and a current controller. The voltage controller uses a voltage control system to produce first data, based on the reference signal and the measured signals, and outputs the first data to the current controller. The current controller uses a current control system to produce second data, based on the first data and the measured signals. The controller determines the control data based on the second data. The controller controls the power converter in the first limiting mode by setting the first data to be equal to the present value and/or the reference value, thereby limiting the power converter output current.

In some embodiments, setting the first data to be equal to a present value and/or a reference value comprises freezing, disabling or not permitting the modified control system from determining some or all of the first data.

In some embodiments, controlling the power converter in the first constrained grid-forming mode comprises unfreezing, enabling, or permitting the modified control system from determining some or all of the first data.

In some embodiments the control system is a single-loop controller.

In some embodiments the control system is a direct voltage controller. The controller comprises a limiting controller. The controller controls the power converter in the first limiting mode by the limiting controller restricting the output current of the power converter from increasing past the present value and/or the reference value, thereby limiting the power converter output current.

In some embodiments the limiting controller restricts the output current of the power converter from increasing past the present value or the reference value by modifying, controlling, and/or restricting the control data.

In some embodiments the control system includes a virtual admittance. The virtual admittance can replace a conventional controller.

In some embodiments the current controller produces the second data relatively faster than the voltage controller produces the first data.

In some embodiments the determining, by the controller, the virtual impedance for the power converter further comprises determining, by the controller, the virtual impedance and a fixed virtual voltage offset for the power converter based on the output current of the power converter; and the modifying, by the controller, the control system based on the virtual impedance further comprises modifying, by the controller, the control system based on the virtual impedance and the fixed virtual voltage offset.

In some embodiments the modifying of the control system based on the virtual impedance comprises determining, by the controller, an adjustment term for the control system by calculating a virtual voltage or a virtual current as a function of the virtual impedance and the output current; and implementing, by the controller, the adjustment term into the control system.

In some embodiments the implementing of the adjustment term includes a modification of the internal voltage phasor reference.

In some embodiments the controller determines the virtual impedance by calculating, whilst the power converter is in the first limiting mode, a virtual voltage defined as a voltage difference between an internal voltage phasor reference for the power converter and a node voltage at a node between an output of the power converter and the grid; and based on a Thevenin equivalent circuit of the power converter connected to the grid, including the virtual voltage, the output current of the power converter in the equilibrium condition, and the virtual impedance, using circuit analysis methods to resolve the Thevenin equivalent circuit for the virtual impedance.

In some embodiments, the controller determines the virtual impedance by calculating, whilst the power converter is in the first limiting mode, a new internal voltage phasor reference and a virtual voltage defined as a voltage difference between the new internal voltage phasor reference for the power converter and a node voltage at a node between an output of the power converter and the grid, and using analytical methods to solve for the virtual impedance and new internal voltage phasor reference.

In some embodiments, the controller determines the virtual impedance and the fixed virtual voltage offset by calculating, whilst the power converter is in the first limiting mode, a virtual voltage defined as a voltage difference between an internal voltage phasor reference for the power converter and a node voltage at a node between an output of the power converter and the grid; and based on a Thevenin equivalent circuit of the power converter connected to the grid, including the virtual voltage, the output current of the power converter in the equilibrium condition, and the virtual impedance, using circuit analysis methods to resolve the Thevenin equivalent circuit for the virtual impedance.

In some embodiments, the method further comprises reducing, by the controller, the virtual impedance, as a result of the voltage difference between (new or original) the internal voltage phasor reference for the power converter and the node voltage at the node reducing in magnitude, and thereby returning to control the power converter in the initial grid-forming mode.

In some embodiments a time period from determining that the first parameter related to the controller and/or the power converter exceeds the first threshold, to the controller completing the step of controlling the power converter (204) in the first liming mode, is less than or equal to 50 ms.

In some embodiments, the determining that the first parameter related to the controller and/or power converter exceeds the first threshold comprises one or more of: determining that a current reference of a dq-frame current regulator using commanded angle or Phase Locked Loop, PLL, angle has saturated; and/or determining that a d or q current reference inputted into a Proportional Integral, PI, controller in a current controller has saturated; and/or determining that a d or q current reference to be inputted, following an inverse reference frame transformation, into a Proportional Resonant, PR, controller in a current controller has saturated; and/or determining that a d or q current reference to be inputted, following an inverse reference frame transformation, into a deadbeat controller in a current controller has saturated; and/or determining that a phasor current limit has been reached; and/or determining that an active power limit has been reached; and/or determining that an energy limit has been reached; and/or determining that a component is pulse dropping or blocking; and/or determining that a voltage reference has saturated; and/or determining that a voltage output has reached a limit; and/or determining that a modulation index has saturated.

In some embodiments, the determining that the second parameter related to the controller and/or power converter exceeds the second threshold comprises one or more of: determining that a current reference of a dq-frame current regulator using commanded angle or Phase Locked Loop, PLL, angle has saturated; and/or determining that a d or q current reference inputted into a Proportional Integral, PI, controller in a current controller has saturated; and/or determining that a d or q current reference to be inputted, following an inverse reference frame transformation, into a Proportional Resonant, PR, controller in a current controller has saturated; and/or determining that a d or q current reference to be inputted, following an inverse reference frame transformation, into a deadbeat controller in a current controller has saturated; and/or determining that a phasor current limit has been reached; and/or determining that an active power limit has been reached; and/or determining that an energy limit has been reached; and/or determining that a component is pulse dropping or blocking; and/or determining that a voltage reference has saturated; and/or determining that a voltage output has reached a limit; and/or determining that a modulation index has saturated.

According to a second aspect, there is provided a controller for controlling a power converter connected to a grid, the controller comprising: a control system arranged to determine control data based on measured signals indicative of currents and/or voltages downstream from the power converter, and a reference signal. The controller is arranged to control the power converter in a grid-forming mode to output current at a nominal voltage, based on the control data. The controller is configured to determine that a first parameter related to the controller and/or the power converter exceeds a first threshold. Responsive to determining that the first parameter exceeds the first threshold: control the power converter in a first limiting mode, wherein the controller is configured to limit the power converter output current based on a present value and/or a reference value; and determine the output current of the power converter. Responsive to determining that the output current is at or is close to an equilibrium condition, the controller is configured to determine a virtual impedance for the power converter based on the output current of the power converter; modify the control system based on the virtual impedance; and control the power converter in a first constrained grid-forming mode, wherein the modified control system is configured to determine the control data based on measured signals of currents and/or voltages downstream from the power converter, and a reference signal.

Generally, the controller tends to be configured to execute the methods described herein.

In some embodiments, determining the output current of the power converter comprises estimating the output current.

In some embodiments, determining the output current of the power converter comprises measuring the output current.

In some embodiments, determining the output current of the power converter comprises using a reference for the output current.

In some embodiments, the virtual impedance is a fixed or a static virtual impedance. This means that only one value for the virtual impedance is determined, and the determined value of the virtual impedance does not change during the constrained grid-forming mode.

In some embodiments, setting the first data to be equal to a present value or a reference value comprises freezing, disabling or not permitting the modified control system from determining some or all of the control data.

In some embodiments, controlling the power converter in the first constrained grid-forming mode comprises unfreezing, enabling, or permitting the modified control system from determining some or all of the first data.

In some embodiments, the controller is further configured to determine that a second parameter related to the controller and/or the power converter exceeds a second threshold; responsive to determining that the second parameter exceeds the second threshold: control the power converter in a second limiting mode, wherein the controller is configured to limit the power converter output current based on an updated present value and/or an updated reference value; and determine an updated output current of the power converter; responsive to determining that the updated output current is at or is close to an equilibrium condition: determine an updated virtual impedance for the power converter based on the updated output current of the power converter; further modify the control system based on the updated virtual impedance; and control the power converter in a second constrained grid-forming mode, wherein the further modified control system is configured to determine the control data based on the measured signals and the reference signal.

By determining that a second parameter related to the controller and/or the power converter exceeds a second threshold, and subsequently controlling the power converter in a second constrained grid-forming mode, an iterative control process can be established wherein a parameter that exceeds a threshold causes the power converter to be controlled in a further constrained mode. Accordingly, there is no limit to the number of parameters that may be determined to exceed a threshold, and subsequently there is no limit to the number of constrained grid-forming modes.

In some embodiments the control system is a cascaded control system including a voltage controller and a current controller. The voltage controller is configured to use a voltage control system to produce first data, based on the reference signal and the measured signals, and output the first data to the current controller. The current controller is configured to use a current control system to produce second data, based on the first data and the measured signals. The controller is configured to determine the control data based on the second data. The controller is further configured to control the power converter in the first limiting mode by setting the first data to be equal to the present value or the reference value, thereby limiting the power converter output current.

In some embodiments the control system is a single-loop.

In some embodiments the control system is a direct voltage controller. The controller comprises a limiting controller. The controller is configured to control the power converter in the first limiting mode by the limiting controller being configured to restrict the output current of the power converter from increasing past the present value and/or the reference value, thereby limiting the power converter output current.

In some embodiments the control system includes a virtual admittance. The virtual admittance can replace a conventional controller.

In some embodiments the current controller produces the second data relatively faster than the voltage controller produces the first data.

In some embodiments the controller being configured to modify the control system based on the virtual impedance comprises the controller being configured to determine an adjustment term for the control system by calculating a virtual voltage or a virtual current as a function of the virtual impedance and the output current; and implement the adjustment term into the control system.

In some embodiments the controller is arranged to implement the adjustment term by modifying the internal voltage phasor reference.

In some embodiments the controller is configured to determine the virtual impedance by calculating, whilst the power converter is in the first limiting mode, a virtual voltage defined as a voltage difference between an internal voltage phasor reference for the power converter and a node voltage at a node between an output of the power converter and the grid; and based on a Thevenin equivalent circuit of the power converter connected to the grid, including the virtual voltage, the output current of the power converter in the equilibrium condition, and the virtual impedance, using circuit analysis methods to resolve the Thevenin equivalent circuit for the virtual impedance.

In some embodiments, the controller is further configured to reduce the virtual impedance, as a result of the voltage difference between the internal voltage phasor reference for the power converter and the node voltage at the node reducing in magnitude, and thereby return to control the power converter in the initial grid-forming mode.

In some embodiments a time period from determining that the first parameter related to the controller and/or the power converter exceeds the first threshold, to the controller completing the step of controlling the power converter (204) in the first liming mode, is less than or equal to 50 ms.

In some embodiments, the controller being configured to determine that the first parameter related to the controller and/or power converter exceeds the first threshold comprises one or more of: determining that a current reference of a dq-frame current regulator using commanded angle or Phase Locked Loop, PLL, angle has saturated; and/or determining that a d or q current reference inputted into a Proportional Integral, PI, controller in a current controller has saturated; and/or determining that a d or q current reference to be inputted, following an inverse reference frame transformation, into a Proportional Resonant, PR, controller in a current controller has saturated; and/or determining that a d or q current reference to be inputted, following an inverse reference frame transformation, into a deadbeat controller in a current controller has saturated; and/or determining that a phasor current limit has been reached; and/or determining that an active power limit has been reached; and/or determining that an energy limit has been reached; and/or determining that a component is pulse dropping or blocking; and/or determining that a voltage reference has saturated; and/or determining that a voltage output has reached a limit; and/or determining that a modulation index has saturated.

In some embodiments, the controller being configured to determine that the second parameter related to the controller and/or power converter exceeds the second threshold comprises one or more of: determining that a current reference of a dq-frame current regulator using commanded angle or Phase Locked Loop, PLL, angle has saturated; and/or determining that a d or q current reference inputted into a Proportional Integral, PI, controller in a current controller has saturated; and/or determining that a d or q current reference to be inputted, following an inverse reference frame transformation, into a Proportional Resonant, PR, controller in a current controller has saturated; and/or determining that a d or q current reference to be inputted, following an inverse reference frame transformation, into a deadbeat controller in a current controller has saturated; and/or determining that a phasor current limit has been reached; and/or determining that an active power limit has been reached; and/or determining that an energy limit has been reached; and/or determining that a component is pulse dropping or blocking; and/or determining that a voltage reference has saturated; and/or determining that a voltage output has reached a limit; and/or determining that a modulation index has saturated.

According to a third aspect, there is provided a power converter comprising: a DC side for connection to a DC source; an AC side for connection to a grid; and the controller of the second aspect.

According to a fourth aspect, there is provided a computer program comprising instructions which when executed by a processor of a controller for controlling a power converter, cause the controller to perform the method of the first aspect.

According to a fifth aspect, there is provided a non-transitory computer-readable storage medium comprising the computer program of the fourth aspect.

It will be appreciated that particular features of different aspects of the invention share the technical effects and benefits of corresponding features of other aspects of the invention. More specifically, the controller, the power converter, the computer program, and the non-transitory computer-readable medium, share the technical effects and benefits of the method of the invention.

It will also be appreciated that the use of the terms "first" and "second", and the like, are merely intended to help distinguish between similar features and are not intended to indicate a relative importance of one feature over another, unless otherwise specified.

Within the scope of this application, it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

DETAILED DESCRIPTION

Figure 1:
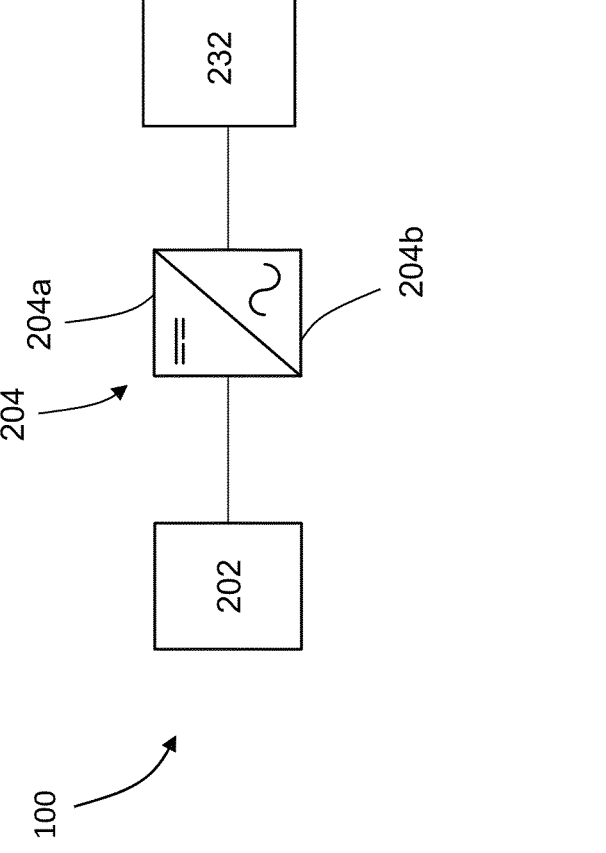
FIG. 1 is a schematic illustration (not to scale) of a power system including a DC power source, a power converter, and a grid.

FIG. 1 is a schematic illustration (not to scale) of a power system 100 including a power converter 204 connected between a DC source 202 and a grid 232. The grid 232 may be an AC grid 232. The illustration is not intended to be limited to representing a particular power system, or connection, or interconnect, but is moreover provided as a generic example illustrating principles of operation of a power system that are useful for understanding the invention. Hence, whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the power system 100 and herein discussed can be applied to interconnects comprising the controller 200 shown in FIG. 2A, or power converters or networks operated using the controller 200.

The power system 100 comprises a first inverter-based resource 204 (also known as a power converter). The power converter 204 is configured to convert DC power to AC power, acting essentially as an inverter. The power converter 204 is also configured to convert AC power to DC power, acting essentially as a rectifier. The power converter 204 may represent a cluster of multiple power converters that may be close in electrical proximity and that behave in a coherent manner with respect to grid events or control references. The power converter 204 may comprise a single converter in the case of a monopole system, or two converters in the case of a bipole system. The power converter 204 may represent a plurality of converter stations arranged as a multi-terminal power transmission system. In this example, the power converter 204 comprises a DC side 204a and an AC side 204b.

The power converter 204 is connected to the DC source 202 via a first line 206. The DC source 202 is connected to the DC side 204a of the power converter 202 via a second line 208. The first and second lines 206, 208 are illustrative and do not represent any particular type of connection or cable.

The power converter 204 is connected to the grid 232. The grid 232 is connected to the AC side 204b of the power converter 204.

The DC source 202 and/or the grid 232 may be electrical power transmission systems comprising power generation apparatus, transmission apparatus, distribution apparatus, and electrical loads. The DC source 202 may comprise a renewable power generation resource such as a wind-power generation resource, solar-power generation resource, battery generation resource, supercapacitor generation resource, bio-power generation resource, etc. The DC source

202 may alternatively comprise a network of such resources. The grid 232 may be a consumer network. By way of non-limiting example, the DC source 202 may be a power generation network, with the grid 232 being a consumer network, for instance. The DC source 202 and/or the grid 232 can be of any size and, due to operational factors, can have changing electrical characteristics.

The operation of the power system 100 can be generically described as follows. The DC power source 202 provides DC power to the power converter 204 at the DC side 204a. The power converter 204 converts the received DC power to AC power for the grid 232. The AC power is transmitted from the AC side 204b to the grid 232 for consumption, for instance. In particular examples, the power converter 204 may reside within an off-shore wind farm or may reside on-shore.

In the case that the DC power source 202 is an energy storage device or a High Voltage Direct Current (HVDC) transmission line, power can flow from the grid 232 to the DC power source 202. In this case, the grid 232 provides AC power to the power converter 204 at the AC side 204b. The power converter 204 inverts the received AC power to DC power for the power source 202. The DC power is transmitted from the DC side 204a to the power source 202.

It will be appreciated that various additional electrical components may be located at any particular location or with any particular feature/component in the example power system 100. These may include switches, transformers, resistors, reactors, surge arrestors, doubly-fed induction generators, harmonic filters and other components well known in the art. These additional electrical components may be in series with or in parallel to the first and/or second lines 206, 208 in the power system 100. For example, the second line 208 may comprise three additional electrical components, including: a first cable connected between poles of the AC side 204b and a first set of windings of a transformer; the transformer; and a second cable connected between a second set of windings of the transformer and the grid 232. In another example, the AC side 204b may be connected to a first set of windings of a doubly-fed induction machine, and the grid 232 may be connected to a second set of windings of the doubly-fed induction machine.

It will be appreciated that converters or power conversion means may comprise a number of different technologies such as voltage sourced converters (for instance using insulated gate bipolar transistor (IGBT) valves). Such converters may generally be considered to use 'power electronics'. Power electronic converters may comprise multi-level voltage sourced converters, for instance.

It will be appreciated that cables used as power transmission mediums may comprise the following non-limiting examples of crosslinked polyethylene (XLPE) and/or mass impregnated (MI) insulation cables. Such cables may comprise a conductor (such as copper or aluminium) surrounded by a layer of insulation. Dimensions of cables and their associated layers may be varied according to the specific application (and in particular, operational voltage requirements). Cables may further comprise strengthening or 'armouring' in applications such as subsea installation. Cables may further comprise sheaths/screens that are earthed at one or more locations.

Moreover, it will be understood that the power system 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 120°.

In a three-phase power system, phase currents and voltages can be represented by three single phase components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second and third-phases, of a three-phase system, in magnitude or phase angle, can give rise to negative or zero-sequence components. Such an unbalance can be caused by a fault or change in grid conditions for instance in the grid 232, herein referred to as a grid event.

Figure 2A:
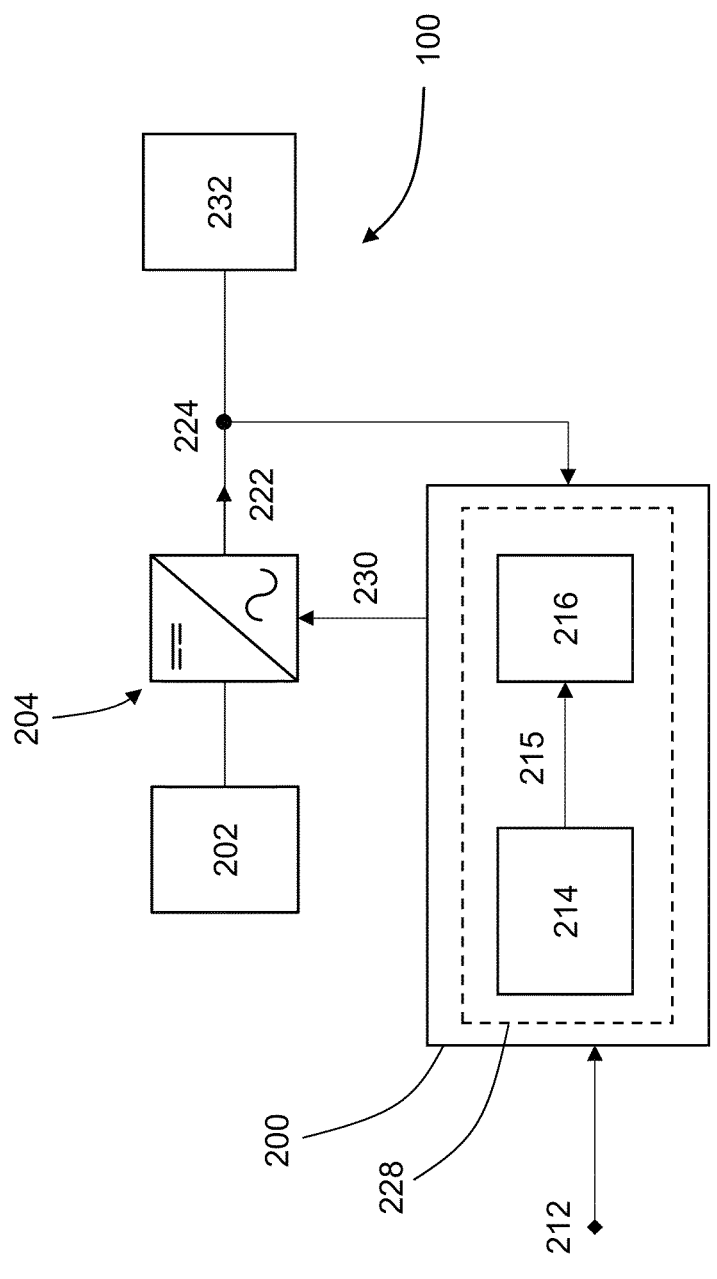
FIG. 2A is a schematic illustration (not to scale) of a controller for a power converter and a power system.

FIG. 2A is a schematic illustration showing an embodiment of a controller 200 as may be used in implementing the methods described herein, in order to control the power converter 204 shown in FIG. 1 to operate in a grid-forming (GFM) mode.

Figure 2B:
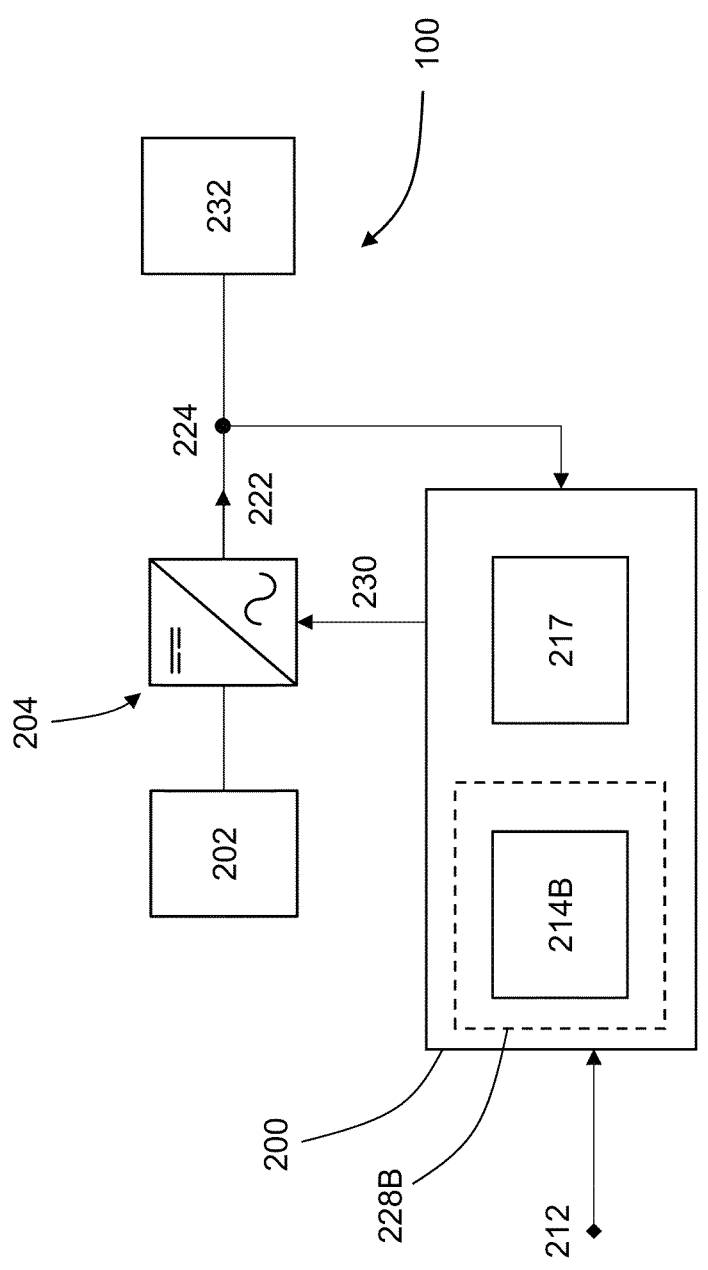
FIG. 2B is a schematic illustration (not to scale) of a controller for a power converter and a power system.

As shown in FIG. 2A, the power system 100 includes the DC source 202, the power converter 204, the grid 232, and a controller 200. The controller 200 is connected to the power converter 204. Another example of the power system 100 including the DC source 202, the power converter 204, the grid 232, and the controller 200 is shown in FIG. 2B.

The controller 200 receives a reference signal 212 and measured signals 222, 224. The controller 200 outputs control data 230 to the power converter 204.

The control data 230 may comprise a pattern of gate pulses that may be used to switch semiconductor devices within the power converter 204 in such a manner so as to rapidly obtain (e.g., in much less than 10 ms) a desired AC voltage waveform (consisting, at least in part, of a fundamental-frequency voltage magnitude and phase angle) at the poles of the power converter 204, and furthermore the gate pulses may be used to achieve the particular reference signal 212 at either the poles of the power converter 204 or at a location in close proximity to the poles of the power converter 204.

The reference signal 212 may be an internal voltage phasor reference, comprising of a voltage magnitude reference and a phase angle reference. The reference signal 212 is provided to the controller 200 by a grid-forming controller (not shown), that may be external to the controller 200. The voltage magnitude reference and the phase angle reference of the reference signal 212 may vary with time, based on measured signals 222, 224 and in accordance with a control objective of the grid-forming controller.

The grid-forming controller may use grid-forming control algorithms to produce the reference signal 212. The grid-forming control algorithm may consist of any one of: a virtual synchronous machine-based grid-forming algorithm (also known as an 'inertial power regulator'), a droop-control-based grid-forming algorithm, a virtual oscillator control (VOC) based grid-forming algorithm, an isochronous (fixed-frequency) grid-forming control algorithm, or any variation of the above. Regardless of the type of grid-forming algorithm, the grid-forming algorithm will generally, under normal operating conditions, vary the phase angle reference, to achieve autonomous synchronization with other grid-forming power converters and possibly also achieve a desired active power output.

The grid-forming control algorithm enables the grid-forming controller to accomplish the aforementioned objections autonomously, using only local voltage and current measurements. The grid-forming control algorithm can also contain a reactive power regulation component, also known as a 'Q controller', that regulates the outputted reactive power and/or local voltage magnitude at a nearby point of regulation to a desired setpoint. Reference setpoints to the grid-forming algorithm may consist of active power and reactive power reference signals that may be fixed, or may alternatively be time-varying and provided by another external controller or remote grid operator. Under conditions in which the grid 232 represents a relatively 'stiff' grid or bulk power system, the grid-forming algorithm will typically achieve the objectives (i.e., achieve active and reactive power references) with zero steady-state error, with a typical settling time of at least 100 ms to approximately several seconds.

Under certain circumstances, such as in islanded condition (in which the grid 232 may contain no other grid-forming or synchronous generation power converters, and may contain any amount of total load, possibly including zero total load), the requirement for power balance between generation and load is often given a higher priority than any requirement to adhere to active and/or reactive power setpoints, and the grid-forming control algorithm may be expected to not exactly achieve its active and/or reactive power reference in the steady-state. In this case, the grid-forming resource, for example the power converter 204, may be expected to continue to synchronize (settle at a stable, steady-state equilibrium) with any other grid-forming resources, for example, other power converters, that may be present in the islanded network, and furthermore, in order to meet the load present within the island, provide or absorb active and/or reactive power in a manner that may not achieve the active and reactive power references provided to the grid-forming resource, for example the power converter 204.

The voltage magnitude reference and phase angle reference produced by the grid-forming algorithm, and contained in the reference signal 212, are used by the controller 200 to determine the control data 230, as discussed in more detail later below. Under normal operation conditions, depending upon the type of voltage control method employed within the controller 200, control data 230 may be generated by the controller 200 to produce an AC voltage waveform (consisting, at least in part, of a fundamental-frequency voltage magnitude and phase angle) at the poles of the converter that generally can differ, both transiently and in the steady-state, from the fundamental-frequency voltage magnitude and phase angle components contained in the reference signal 212.

The measured signals 222, 224 are indicative of currents 222 and/or voltages 224 downstream from the power converter 204.

The controller 200 comprises a control system 228, which in this example is a cascaded control system 228. The controller 200 may alternatively comprise a single-loop voltage control 228B, discussed further below. The cascaded control system 228 comprises a voltage controller 214 and a current controller 216, as shown in FIG. 2A.

The voltage controller 214 uses a voltage control system to produce first data 215, based on the reference signal 212 and the measured signals 222, 224, and outputs the first data 215 to the current controller 216. The phase angle component of the reference signal 212 may optionally be used for one or more reference frame transformations within the voltage controller 214. The current controller 216 uses a current control system to produce second data, based on the first data 215 and the measured signals 222, 224. The current controller 216 may also, in some embodiments, use the voltage magnitude and/or phase angle components of the reference signal 212 in one or more feedforward control features and/or reference frame transformations contained within the current controller 216. The controller 200 determines the control data 230 based on the second data.

The cascaded control system 228 works as follows. The controller 200 generates control data 230 that produces a time-varying voltage waveform (consisting, at least in part, of a time-varying, fundamental-frequency voltage magnitude and phase angle) at the poles of the power converter 204 that, in general, does not necessarily match the magnitude and/or phase angle components of the reference signal 212. Rather, under normal circumstances, the generated power converter 204 pole voltage will rapidly vary, as necessary, to realize the magnitude and phase angle components of the reference signal 212, at a point of regulation that is in close electrical proximity to, but not directly at, the poles of the power converter 204. This point of regulation may, for example, be located on the grid-side winding terminals of an AC transformer that couples the power converter 204 to the grid 232. It is expected that the voltage magnitude and phase angle components of the reference signal 212 will vary in time in response to grid events, in accordance with the grid-forming control objective discussed above. Since the voltage control system of the voltage controller 214 has a control bandwidth much higher than that of the grid-forming control algorithm (e.g., by a factor of 7 to 10) provided by the grid-controller, it is expected that the voltage magnitude and phase angle components of the fundamental-frequency of the power converter 204 pole voltage will vary more rapidly than the voltage magnitude and phase angle components of the reference signal 212.

The controller 200 may alternatively comprise a single-loop voltage control system 228B as shown in FIG. 2B. The single-loop voltage control system 228B comprises a single-loop controller 214B that produces control data 230 based on the reference signal 212 and measured signals 222, 224.

The single-loop voltage control system 228B works as follows. The controller 200 generates control data 230 that produces a time-varying voltage (consisting, at least in part, of a time-varying, fundamental-frequency voltage magnitude and phase angle) at the poles of the power converter 204 that, in general, does not necessarily match the magnitude and/or phase angle components of the reference signal 212. Similar to the case of the cascaded control system 228, the generated power converter 204 pole voltage will vary, as necessary, to realize the magnitude and/or phase angle components of the reference signal 212 at a point of regulation that is in close electrical proximity to the poles of the power converter 204, but not directly at the poles of the power converter 204.

In an alternative example, the single-loop controller 214B may instead comprise a 'direct voltage control' system wherein the data 230 is derived more directly from the reference signal 212. In the case of the direct voltage control system, under normal operating conditions, the control data 230 generated by the controller 200 results in a fundamental-frequency voltage magnitude and phase angle at the poles of the power converter 204 that closely matches (both transiently and in the steady-state) the voltage magnitude and phase angle contained in the reference signal 212.

In the case that either the single-loop voltage control system or the direct voltage control system is employed, the single-loop controller 214B may furthermore include current-limiting control features that are temporarily activated during abnormal grid events, such as a severe fault. These current-limiting control features, when active, modify the control data 230 to effectively restrict the current or some component of the current to a maximum value in order to allow continued operation of the converter hardware, resulting in temporary abandonment of the nominal control objective of the controller 200.

Regardless of the type of voltage control system that is used, the controller 200 may also use a 'nominal virtual impedance'. To achieve this, the voltage magnitude reference and voltage angle reference within reference signal 212 are first modified by the controller 200 to accommodate for a time-varying phasor voltage drop proportional to the measured or anticipated output current of the power converter 204. The controller 200 may employ various means by which to compute the nominal virtual impedance phasor voltage drop. For example, it can consist of the product of a complex-valued nominal virtual impedance with a time-varying current phasor measurement obtained using the measured current 222. Alternatively, the nominal virtual impedance voltage drop may be equal to the product of the nominal impedance and a current phasor reference derived from the second data 215. The nominal virtual impedance used in the calculation is fixed, i.e., it does not change in a smooth or discrete manner except in rare instances (e.g., in order to compensate for a change in grid strength).

In the case that the controller 200 comprises a cascaded controller 228 or a single loop controller 228B, and a nominal virtual impedance is used, the power converter 204 pole voltage will be rapidly manipulated to realize, at the point of regulation, a voltage phasor equal to the reference signal 212 (the internal voltage phasor reference) minus the nominal virtual impedance voltage drop.

In the case that the controller 200 comprises a direct voltage controller, the time-varying, fundamental-frequency voltage magnitude and voltage phase angle at the poles of the power converter 204 will comprise a voltage phasor equal to the reference signal 212 (the internal voltage phasor reference) minus the nominal virtual impedance voltage drop.

The control data 230 is provided to the power converter 204. The power converter 204 operates, i.e., performs conversion of DC power to AC power or conversion of AC power to DC power, as well as production or absorption of reactive power, based on the control data 230. In this manner, the control data 230 controls the power converter 204.

Although not shown in FIG. 2A, the controller 200 may comprise a memory and at least one processor. The memory may comprise computer-readable instructions, which when executed by the at least one processor, cause the controller 200 to perform the method(s) described herein.

Also, although not shown in FIG. 2A, the controller 200 may further comprise a transceiver apparatus. The transceiver apparatus may comprise a separate transmitter and receiver. The transceiver apparatus may be used to operatively communicate with other components described herein either directly, using a wired or wireless means, or via a further interface such as a network interface. The transceiver apparatus may for instance send and receive control signals using the transmitter and receiver. The control signals may contain or define electrical control parameters such as reference currents or reference voltages.

The at least one processor may be capable of executing computer-readable instructions and/or performing logical operations. The at least one processor may be a microcontroller, microprocessor, central processing unit (CPU), field programmable gate array (FPGA) or similar programmable controller. The controller 200 may further comprise a user input device and/or output device. The processor may be communicatively coupled to the memory and to the transceiver.

The memory may be a computer readable storage medium. For instance, the memory may include a non-volatile computer storage medium. For example, the memory may include a hard disk drive, flash memory, etc.

Also, although not shown in FIG. 2A, the controller 200 may additionally include a user input device interface and/or a user output device interface, which may allow for visual, audible and/or haptic inputs/outputs. Examples of such user input/output devices include, but are not limited to, interfaces to electronic displays, touchscreens, keyboards, mice, speakers and microphones.

As discussed above, in the example disclosed, the controller 200 provides control data 230 to the power converter 204. In a normal operating condition, the control data 230 controls the power converter 204 in a grid-forming (GFM) mode. Aspects of the disclosure provide improvements when the power converter 204 is operating and there is a grid event, as will now be discussed.

Figure 3:
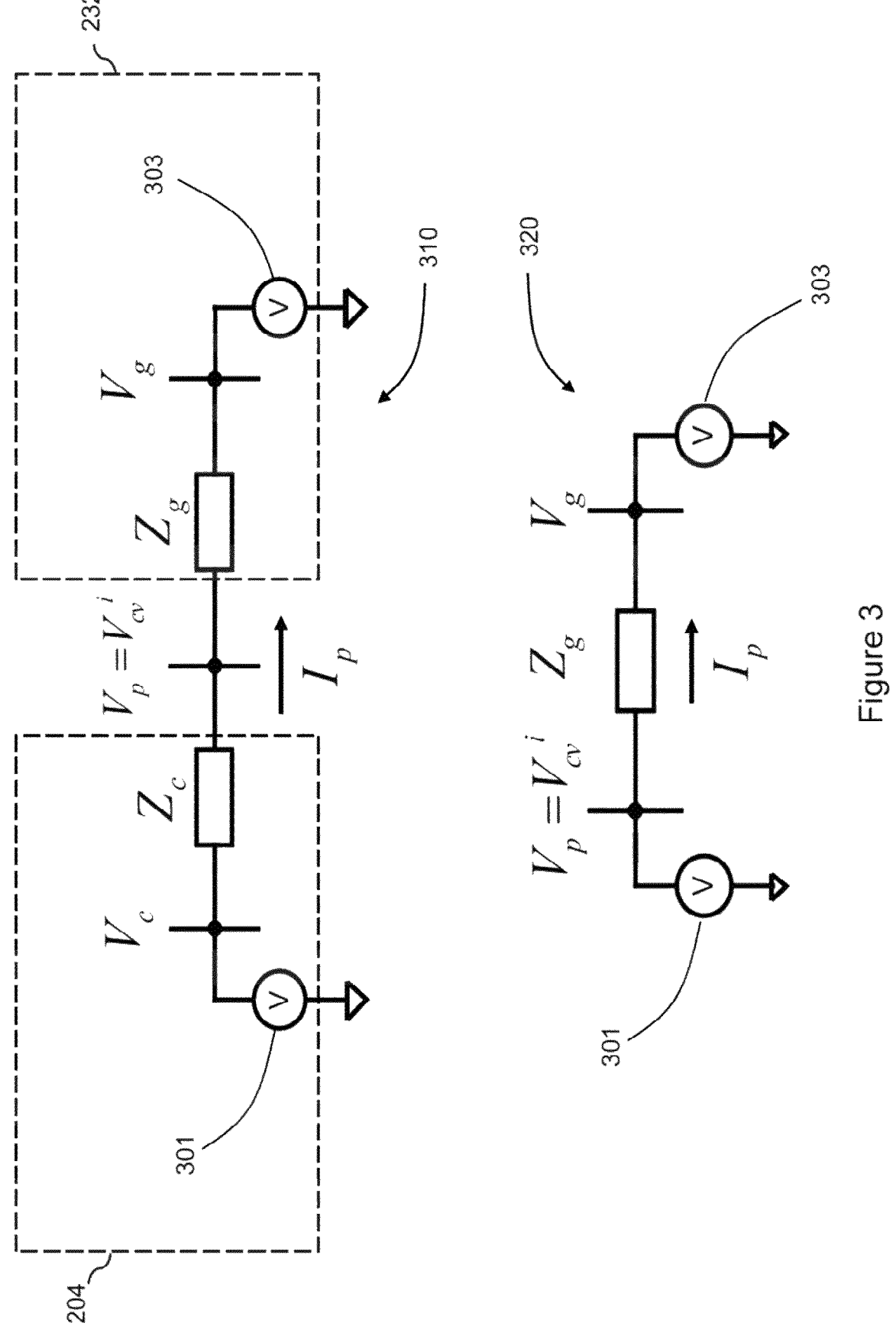
FIG. 3 is a schematic illustration (not to scale) of an electrical circuit and a simplified electrical circuit of the power system during normal conditions.

The cascaded control system 228 is used by the controller 200 to control the power converter 204 as a grid-forming resource. With reference to FIG. 3, a first circuit diagram 310 and a second circuit diagram 320 can be used to illustrate the power system 100 during the normal condition. When operating in the GFM mode, under normal conditions, the power converter 204 is controlled to output power to the grid 232 at a nominal voltage. FIG. 3 shows: a Thevenin voltage phasor $V_g$ of the grid 232; a converter voltage phasor $V_c$ at a pole of the power converter 204; an initial internal voltage phasor reference $V_{cv}{}^i$ (i.e., an output of an inertial power regulator and 'Q controller') of the power converter 204; a Thevenin impedance $Z_g$ of the grid 232; a converter impedance $Z_c$ of the power converter 204 coupling (i.e., a grid-tie) to the grid 232 (due to, for example, transformer 'leakage reactance(s)', filters, valve inductances, etc.; note that this does not include the nominal virtual impedance, discussed above); a coupling voltage $V_p$ at a point of common coupling (point of regulation) of the power converter 204 to the grid 232; and an output current $I_p$, 222 of the power converter 204. The second circuit diagram 320 is a simplified version of the first circuit diagram 310. The second circuit diagram 320 is simplified because, in the normal operating conditions, the coupling voltage $V_p$ is approximately equal to the initial internal voltage phasor reference $V_{cv}{}^i$, and thus the converter impedance $Z_c$, while still physically present, can be considered to have negligible impact on the behaviour of the system in the timescale of interest (sub-transient to transient) and is therefore removed from the circuit diagram. With continued reference to FIG. 3, the power converter 204, when viewed in terms of electrical characteristics, comprises the converter impedance $Z_c$ and a converter voltage source 301 (which produces the converter voltage phasor $V_c$). This is because, as discussed above, the power converter 204 is controlled in a GFM mode, and as such the power converter 204 comprises the converter voltage source 301.

The grid 232, when viewed in terms of electrical characteristics, comprises the Thevenin impedance $Z_g$ and a grid voltage source 303 (which produces the Thevenin voltage phasor $V_g$). As discussed above, the grid 232 can be a consumer network, and there may be any number of power stations connected to and supplying the grid 232 with electrical energy. The grid 232 thus comprises both the consumer network and the power stations. The consumer network can be simplified to the Thevenin impedance $Z_g$. The power stations can be simplified to the grid voltage source 303 which is responsible for providing and maintaining the Thevenin voltage phasor $V_g$. Generally, due to the scale of the consumer network and the power stations, in practice it is not possible to know, measure or determine the Thevenin impedance $Z_g$ and/or the Thevenin voltage phasor $V_g$.

A fault in the consumer network will result in a change in the Thevenin impedance $Z_g$ and a fault in the power stations will result in a change in the Thevenin voltage phasor $V_g$. Either of these faults is a fault in the grid 232. During normal conditions, however, there is no such fault in the grid 232.

If a fault occurs in the grid 232, or other severe grid disturbance, herein referred to as a grid event, it is possible that the power converter 204 will experience a current, power, or energy overload, because the power converter 204 is regulating voltage and not current, power or energy. For power converters controlled in a usual GFM mode, this overload tends to cause the power converter to trip offline, or, in a worst-case scenario, tends to damage the semiconductor devices within the power converter and indefinitely render the power converter inoperable.

During such a grid event, self-protection of the power converter is to be ensured, and current limiting is typically achieved via switching the control to a GFL mode. However, switching the control mode in such a manner has the potential to jeopardize the stability of the power converter and the stability of the overall power system. The controller 200 tends to eliminate or reduce this by controlling the power converter 204 in accordance with the method disclosed in FIG. 4.

Figure 4:
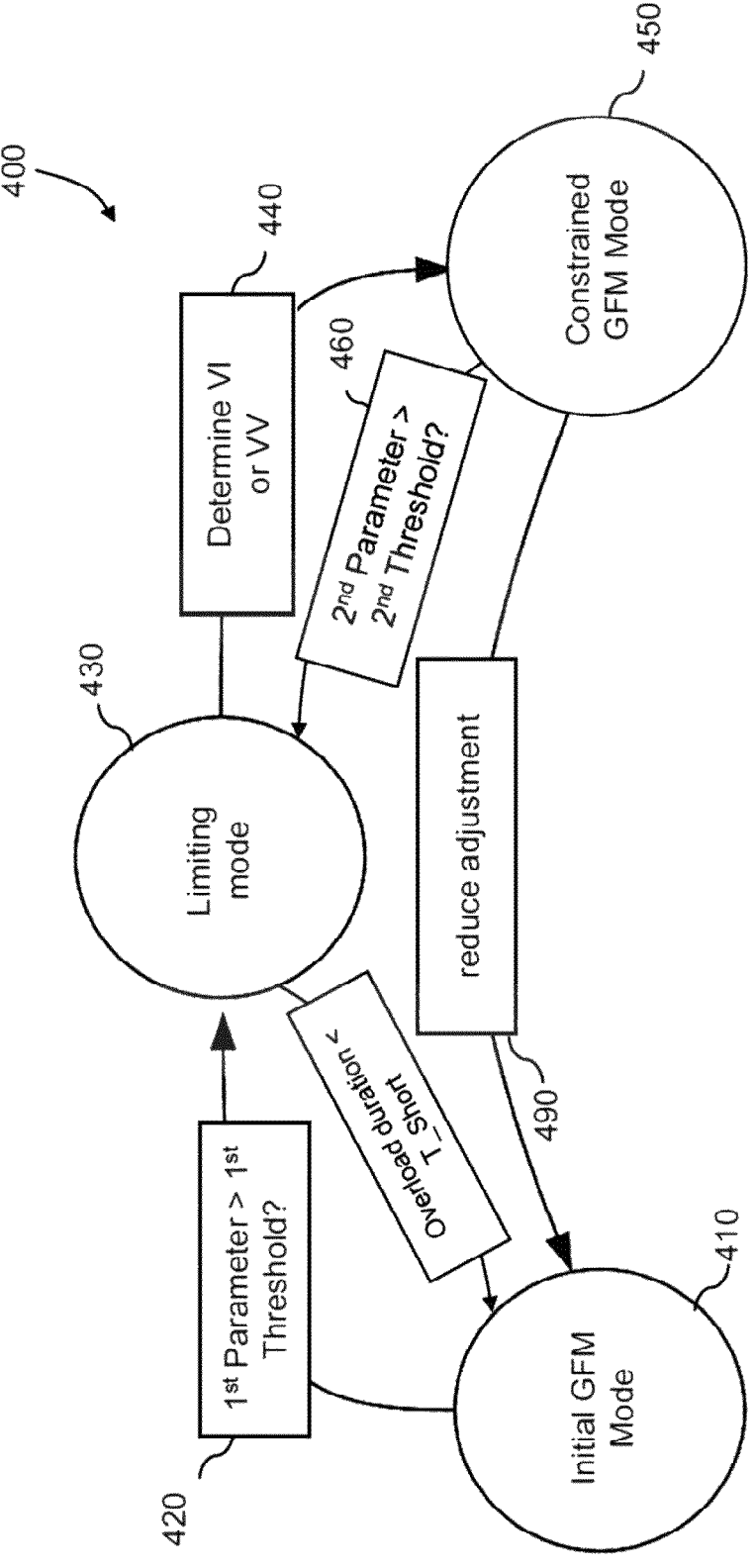
FIG. 4 is a schematic illustration (not to scale) of a method used to control a power converter in accordance with embodiments of this disclosure.

As shown in FIG. 4, the power converter 204 is initially controlled in a GFM mode 410 to output power at a nominal voltage, based on the control data 230 provided by the controller 200. The control system 228 determines the control data 230 based on the measured signals 222, 224 and the reference signal 212. The controller 200 monitors a first parameter related to the controller 200 and/or the power converter 204 to determine whether the first parameter exceeds a first threshold. Under normal conditions, the first parameter does not exceed the first threshold, and the power system 100 is operating as depicted in the first and second circuit diagrams 310, 320 shown in FIG. 3.

A grid event then occurs in the grid 232. In this example, the grid event causes the Thevenin voltage phasor $V_g$ to drop. The controller 200 monitors the first parameter, and determines 420 that the first parameter related to the controller 200 and/or the power converter 204 exceeds the first threshold. The first parameter therefore exceeds the first threshold as a result of the grid event.

Determining 420 that the first parameter has exceed the first threshold may comprise one or more of: determining that an individual d or q channel of the current reference of a positive sequence dq-frame current regulator has saturated (with positive-sequence d and q channel currents appropriately decomposed into their respective orthogonal channels, with respect to a positively-rotating reference frame that rotates synchronously with a reference angle outputted from a grid-forming algorithm, or with respect to a positively-rotating reference frame that rotates synchronously with a Phase Locked Loop, PLL, angle that is locked to a measured positive sequence voltage); determining that an individual d or q channel of the current reference of a negative sequence dq-frame current regulator has saturated (with negative sequence d and q channel currents appropriately decomposed into their respective orthogonal channels, with respect to a negatively-rotating reference frame that rotates at the same speed as the reference angle outputted from a grid-forming algorithm but in a negative (opposing) direction, or with respect to a negatively-rotating reference frame that rotates synchronously with a PLL angle that is locked to a measured negative sequence voltage); and/or determining that a Proportional Integral, PI, controller in the current controller 216 with an dq current reference has saturated; and/or determining that a Proportional Resonant, PR, controller in the current controller 216 with an abc current reference or an alpha-beta reference has saturated; and/or determining that a phasor current limit has been reached; and/or determining that a component is pulse dropping or blocking; and/or determining that a voltage reference has saturated; and/or determining that a voltage output has reached a limit; and/or determining that a modulation index has saturated.

The first threshold is specified as a quantity or set of quantities that is close to the resource's true physical operating limit, and/or close to an intrinsic or externally-imposed operating limit. The first threshold may be crafted in a particular manner so as to fulfil a grid code requirement, e.g. to favour production of active versus reactive power during the transient (e.g., threshold is greater for d-axis current than it is for q-axis current, assuming a dq0 reference frame rotating synchronously with the GFM controller's internal voltage angle command).

Alternatively, the first threshold may be chosen to favour production of positive or negative sequence current or voltage. In a similar manner, the actual maximum permissible threshold of the component or resource is defined by a second threshold.

For example, in one embodiment wherein the output current is the variable that is to be limited, the first threshold could be defined as the perimeter or border of a two-dimensional shape that dictates the permissible region in which the resource's outputted current, defined as a scalar complex-valued number or 'space vector', could reside (the space vector drawn from the origin of the complex plane would not be permitted to terminate at a value outside the shape defined by a perimeter which is the first threshold); this shape could be a circle (e.g., FIG. 7), rectangle, or any other shape on a 2-dimensional complex plane, with the first threshold somewhat concentric to a somewhat larger shape bordered by a perimeter which is a second threshold, which defines the actual physical limit.

In one embodiment, the shape bordered by the threshold first threshold is a circle with a radius equal to 0.95, corresponding to a per-unit current magnitude threshold of 0.95 percent of the rated current, with current magnitude calculated as a function of d-axis and q-axis current, in a conventional manner such as via the Euclidean norm, and the second threshold is a slightly larger, concentric circle with a radius of 1.0 or 1.1.

In response to determining that the first parameter exceeds the first threshold 420, the controller 200 controls the power converter 204 in a first limiting mode 430, by limiting the power converter 204 output current 222 based on a present value or a reference value.

In the case that the controller 200 comprises a cascaded control system 228, the first limiting mode 430 is achieved by setting the first data 215 to be equal to its present value or the reference value, thereby limiting the power converter (204) output current (222).

In the case that the controller 200 comprises a single-loop or direct control system 228B, the controller 200 further comprises a limiting controller 217 that restricts the output current 222 from increasing past the present value or the reference value, thereby limiting the power converter (204) output current (222).

In the example of the cascaded control system 228, as a result of setting the first data 215 to be equal to its present value or the reference value, the control data 230 will, relatively quickly in a sub-transient timescale, manipulate the fundamental-frequency voltage waveform at the poles of the power converter 204 such that the output current 222 converges to a current value.

The current magnitude and the current phase angle will remain relatively unchanged for the remainder of the duration spent in the first limiting mode 430, and absent any further grid events during the time period spent in the first limiting mode 430, the control data 230 will also reach a steady state and is not expected to substantially change.

Regardless of the type of control system 228, 228B used, in the first limiting mode 430, a part of the control system 228, 228B is disabled from determining values for the control data 230 based on the measured signals 222, 224 and the reference signal 212, in order to limit the output current (222) of the power converter (204).

A present value is the value of a current reference contained in the controller 200 when the determination was made that the first parameter exceeded the first threshold. In this manner, the current reference is effectively 'frozen', i.e., the current reference remains at the same value it was at when the determination was made that the first parameter exceeded the first threshold.

In some examples, the current reference is 'fixed' in terms of current magnitude and current phase angle only with respect to a reference frame defined by a particular angle. The choice of angle used to define the reference frame depends upon the design of the current regulator or transient current limiter, and may, for example, comprise the grid-forming voltage angle reference contained in reference signal 212, or may alternatively be derived from a PLL, frequency-locked loop (FFL), second-order generalized integrator (SOGI), or by other means.

In the first limiting mode 430, because the current reference contained within the controller 200 is set to the present value or the reference value, any higher-level controllers (for example, the voltage controller 214, or the grid-forming controller that produces the reference signal 212) that may have otherwise affected the value of the control data 230 or the current reference can optionally also be 'frozen', i.e., their control behaviour modified such that their outputs are locked at a particular value.

In particular, if the voltage controller 214 is present, it may be desirable to freeze the voltage controller 214.

In the case that one or more integrators are present in any of the higher-level controllers of interest, 'freezing' of the controller can involve a temporary nulling of the input of these integrators, or any other control action that has a similar effect.

It may not be necessary to freeze the grid-forming algorithm which produces the reference signal 212. This is because the grid-forming algorithm tends to have a slow bandwidth which causes it to have a relatively slow, in a sub-transient time scale, response time Therefore, in the first limiting mode 430, the initial internal voltage phasor reference $V_{cv}{}^i$ of the power converter 204 is not expected to change drastically, regardless of a change in the measured signals 222, 224.

Furthermore, in some examples, the slow changes in the reference signal 212 can potentially be beneficial, as these changes may help to drive the power system 100 towards synchronism by shifting the reference frame of the fixed current phasor reference. However, since it is expected that the power converter 204 remains in the first liming mode 430 only briefly (e.g., less than 50 ms), the initial internal voltage phasor reference $V_{cv}{}^i$ will not change much during this time.

As discussed above, the grid event will cause a change in the Thevenin voltage phasor $V_g$ of the grid 232. A stationary or frozen initial internal voltage phasor reference $V_{cv}{}^i$ with a change in the Thevenin voltage phasor $V_g$ of the grid 232 will cause a change in the coupling voltage $V_p$. Thus, the second circuit diagram 320, as discussed in relation to FIG. 3, will not be valid for the first limiting mode 430.

Figure 5:
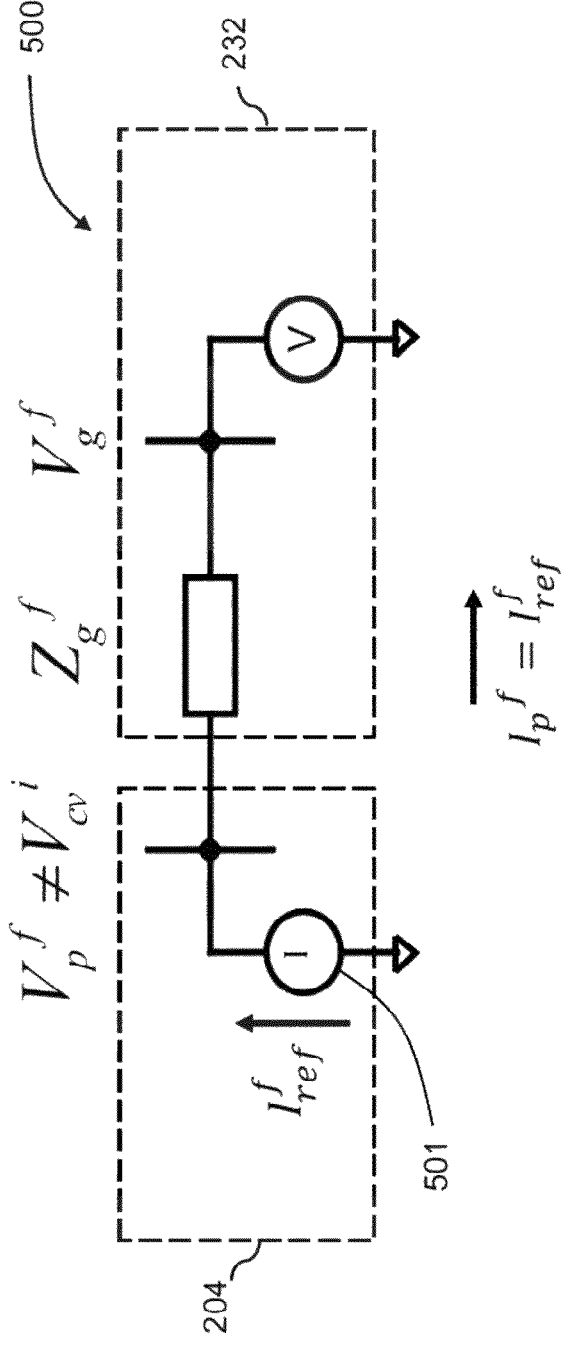
FIG. 5 is a schematic illustration (not to scale) of an electrical circuit of the power system during a grid event.

A simplified electrical diagram showing the operation of the power converter 204 and the grid 232 during the first limiting mode 430 is shown in FIG. 5 as a third circuit diagram 500. The third circuit diagram 500 shows: a faulted Thevenin voltage phasor $V_g{}^f$ of the grid 232; the initial internal voltage phasor reference $V_{cv}{}^i$ of the power converter 204; a faulted Thevenin impedance $Z_g{}^f$ of the grid 232; a faulted coupling voltage $V_p{}^f$ at a point of common coupling (point of regulation) of the power converter 204 to the grid 232; an output current during grid event $I_p{}^f$, 222 of the power converter 204; and a reference current $\bar{I}_{ref}{}^{f+}$ for the power converter 204 during the grid event.

In the context of this disclosure, the term 'faulted' may not necessarily refer to a specific grid short circuit or open circuit condition, but is used to denote, in a broader sense, any grid event that may result in the grid-forming resource experiencing a transgression of a parameter, for example a current limit threshold. A non-exhaustive list of such grid events is provided as follows: a symmetric or asymmetric line-to-ground or line-to-line short circuit when islanded or grid-tied, a symmetric or asymmetric line opening while islanded or grid-tied, a sag or swell in a voltage magnitude of the power grid when grid-tied, a load step or jump in a phase angle of the power grid when grid-tied, an unanticipated control action taken by a neighbouring resource, unexpected loss of a neighbouring resource when islanded or grid-tied, a large step in a constant-power load, constant current load, constant impedance load, or machine load, an intentional or unintentional islanding event or sudden change in grid strength, an intentional or unintentional synchronization event, or combinations of the aforementioned grid events when islanded or grid-tied such that multiple events occur in a coincident or sequential manner.

The reference current $I_{ref}{}^f$ may be determined by a component in the power system 100 associated with one or more of: limiting the positive or negative sequence current magnitude, limiting active or reactive power transfer, limiting energy transfer to or from the DC source, and/or limiting any other quantity of interest.

Because the first data 215 or the reference current $I_{ref}{}^f$ is set to the present value (i.e., is frozen), the output current 222 will not be changing, assuming the control system 228 or current controller 216 is stable. As a result, in the first limiting mode 430, the output current $I_p{}^f$, 222 of the power converter 204 during the grid event will tend to converge towards an equilibrium, which can generally be signified by a reduction of the magnitude of the current controller error signal (or plurality of current controller error signal magnitudes, in the case that more than one current control channel exists) to a value equal to or close to zero. In the first limiting mode 430, the controller 200 thus effectively controls the power converter 204 as a current source 501.

Controlling the power converter 204 as a current source is similar to controlling the power converter 204 in a grid-following (GFL) mode. The GFL mode tends not to be desirable for long periods of time, as controlling the power converter 204 in the GFL mode tends to prevent the power converter 204 offering the grid 232 support functionality which comes about as a result of operating in a GFM mode. Furthermore, prolonged operation in a GFL mode may also result in loss of stability for the power converter 204 and/or for the power grid 232.

However, the first limiting mode 430 can be stable under strong grid conditions, in which the PLL is not expected to become unstable. Under such conditions, it can furthermore be advantageous to use a PLL for the reference frame of the current reference, as in this case the d- and q-channel components of the current reference can be chosen such that they rapidly and accurately achieve active and/or reactive current setpoints for an indefinite period of time. Accordingly, energy transfer between the DC source 202 and the grid 232 tends to be easier to regulate.

Alternatively, instead of a phase angle derived from a PLL, FFL, or SOGI, the phase angle component of the reference signal 212 can be used as the reference frame of the control data 230 in limit mode 430. The phase angle component may be frozen in this mode, or may optionally be permitted to vary. If the phase angle reference within the reference signal 212 is not frozen during the first limiting mode 430, the slowly-varying phase angle component of reference signal 212 can be used as the reference frame of the first data 215. Such a practice may be considered desirable, as it may permit some limited retainment of the capability of the power converter 204 to pursue the GFM control objective of synchronization.

However, even so, operation in the first limiting mode 430 still does not constitute GFM in the traditional sense, as voltage magnitude is not being regulated, and this shortcoming may result in unexpected outcomes. Therefore, to reduce risk of undesirable behaviour, it is usually intended that the converter 204 does not remain in the first limiting mode 430 for more than approximately 50 to 100 ms, and ideally no more than 30 ms.

The controller 200 typically completes the step of controlling the power converter 204 in the first liming mode 430 (i.e., enabling the power converter 204 to act as a current source), in a time period that is less than or equal to 50 ms from when the determination is made that the first parameter has exceeded the first threshold. As a result, there is a rapid attainment of an equilibrium (i.e., a steady-state), in an electromagnetic timescale, of the output current $I_p$, 222. This advantageously tends to prevent the power converter 204 from tripping offline as hardware-related limits will not be violated. For example, the current limitation achieved in this mode tends to prevent any of the semiconductor devices within the power converter 204 from being damaged.

Referring again to FIG. 4, when the power converter 204 is controlled in the first limiting mode 430 (e.g., in a current-limiting mode), the controller 200 determines the output current $I_p$, 222 of the power converter 204. Responsive to the output current $I_p$, 222 reaching an equilibrium condition, the controller 200 determines a virtual impedance 440 for the power converter 204 based on the output current $I_p$, 222, and output voltage 224.

In some embodiments, instead of using the measured signals 222, 224, the controller 200 may alternatively use a proxy for one or both output signals, such as an anticipated current (i.e., the current phasor reference 215), or the estimated current (e.g., a current estimation that may be obtained via a model of the system, or via an observer), in its determination of a virtual impedance 440. A modified internal voltage phasor reference may also be determined.

Figure 6:
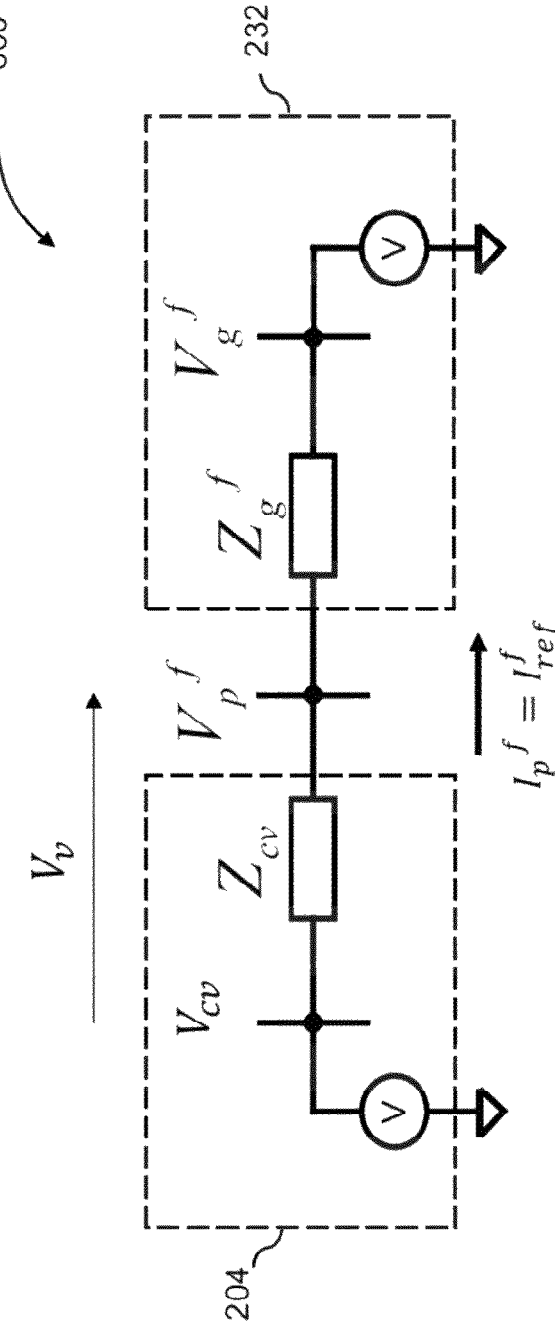
FIG. 6 is a schematic illustration (not to scale) of a Thevenin equivalent circuit including a virtual impedance for the power system, during the grid event.

In the case that a modified internal voltage phasor reference has not already been determined for steady state operation, the controller 200 determines the virtual impedance 440 by calculating, whilst the power converter 204 is in the first limiting mode 430, a virtual voltage $V_v$ defined as a voltage difference between the internal voltage phasor reference $V_{cv}$ of the power converter 204 and a node voltage (faulted coupling voltage) $V_p^f$ at a node 224 (e.g., a point of common coupling) between the power converter 204 and the grid 232. The controller 200 then produces a Thevenin equivalent circuit 600, shown in FIG. 6, of the power converter 204 connected to the grid 232, including the virtual voltage $V_v$, the virtual impedance $Z_{cv}$, and the faulted output current $I_p^f$, 222 of the power converter 204 in the equilibrium condition. The controller 200 then uses circuit analysis to resolve the Thevenin equivalent circuit 600 for the virtual impedance $Z_{cv}$.

Because the Thevenin equivalent circuit 600 is a simple circuit diagram, Ohms law can be used to resolve the Thevenin equivalent circuit 600 as shown in Equation 1.

$$Z_{cv} = \frac{V_{CV} - V_p^f}{I_{ref}^{f+}} \qquad \text{Equation 1}$$

Once the controller 200 has determined the virtual impedance $Z_{cv}$, the controller 200 modifies the control system 228 based on the virtual impedance $Z_{cv}$, by determining an adjustment term for the control system 228, and modifying the control system 228 to include the adjustment term. In the case that a fixed virtual impedance is already employed under the initial grid-forming operating mode 410, the fixed virtual impedance is replaced with the virtual impedance $Z_{cv}$.

The controller then controls the power converter 204 in a first constrained grid-forming mode 450, wherein the modified control system 228 determines the control data 230 based on the measured signals 222, 224 of currents and/or voltages downstream from the power converter 204, and the reference signal 212.

Calculating $Z_{cv}$ in this manner tends to guarantee that the voltage $$V_p^f$$

will not change in the transition from the first limiting mode 430 to the first constrained grid-forming mode 450. This is because the adjustment term is selected such the faulted output current $$I_p^f$$

in the equilibrium condition is the same in the first limiting mode 430 and in the first constrained grid-forming mode 450 (because the faulted output current $$I_p^f$$

will still be equal to $$I_{ref}^{f+}$$

after the transition). Thus, the method of the disclosure tends to accomplish a seamless and near-instantaneous transition back to a (constrained) grid-forming mode.

While Equation 1 demonstrates perhaps the simplest approach to determining a fixed virtual impedance that achieves seamless transition from the first limiting mode 430 to the constrained grid-forming mode 450, it is not the only possible approach. Alternative calculation methods, leveraging the Law of Sines and the Law of Cosines, can be applied to determine a different virtual impedance that may also achieve a seamless transition, while satisfying various objectives. The alternative calculation methods can require a second virtual voltage, comprised of a static or fixed virtual voltage offset, to also be determined, which would be added to the internal voltage phasor reference $V_{CV}$. This second virtual voltage would be applied together with the first (current-dependent) virtual voltage offset associated with the calculated virtual impedance. The second virtual voltage can be considered as a step change in the internal voltage phasor reference, comprising a change in its angle $\angle V_{CV}$, its magnitude $|V_{CV}|$, or both magnitude and angle of $V_{CV}$.

The additional objectives that can be satisfied using the alternative methods may include one or more of the following: an enforcement of a particular magnitude of the virtual impedance; an enforcement of a desired ratio of reactance to resistance within the virtual impedance; and/or an enforcement of a particular value for the internal voltage phasor magnitude and/or phase angle. It should be noted that some of the objectives are mutually exclusive, and furthermore that pursuance of any individual objective can have important implications for the behaviour and/or performance of the system in the constrained GFM mode.

Assume, without loss of generality, that the controller already employs a fixed 'steady-state' virtual impedance $Z_{CVSS}$ with known real and reactive components, which is expected to remain present in both the initial and constrained GFM modes (410 and 450, respectively). Let $V_{CVSS}$ represent the virtual voltage drop across the virtual impedance given by the product of $Z_{CVSS}$ and $I_p$ (or by the product of $Z_{CVSS}$ and some proxy for $I_p$ such as the current reference signal contained in the first data 215, or by an estimate of $I_p$) at the end of the limit mode 430. Assume also that an additional 'current-limiting' virtual impedance $Z_{CVL}$ will be added in series with $Z_{CVSS}$ only in the constrained GFM mode 450 to achieve the seamless transition from limit mode 430 to constrained GFM mode 450, such that in constrained GFM mode 450, $Z_{cv}=Z_{CVL}+Z_{CVSS}$. (Optionally, $|Z_{CVSS}|$ may equal zero).

As an example alternative method to determine a fixed $Z_{CV}$ (and by necessity, $Z_{CVL}$) required for the seamless transition, the following calculations can be performed to determine the required magnitude of additional current-limiting virtual impedance $|Z_{CVZ}|$ and the required internal voltage phasor reference angle $\angle V_{CV}$ needed to achieve the seamless transition, given a desired reactance-to-resistance ratio for the current-limiting virtual impedance, $$r_{XR} = \frac{imag(Z_{CVL})}{real(Z_{CVL})}$$

23                                                    24

(or if known, equivalently, the angle of the current-limiting virtual impedance $\angle Z_{CVL}$), and given a desired magnitude of the internal voltage phasor, $|V_{CV}|$:

$$\angle Z_{CVL} = \tan^{-1}(r_{XR})$$

$$\gamma = \pi - \angle(V_p + V_{CVSS}) + \angle I_p + \angle Z_{CVL}$$

$$B = |V_p + V_{CVSS}|$$

$$C = |V_{cv}|$$

$$\alpha = \pi - \gamma - \sin^{-1}\left(\frac{B}{C}\sin\gamma\right)$$

$$A = C\frac{\sin\alpha}{\sin\gamma}$$

$$|Z_{CVL}| = \frac{A}{|I_p|}$$

$$\angle V_{CV} = \angle(V_p + V_{CVSS}) - \alpha$$

As another example, the following calculations determine the required magnitude of the internal voltage phasor, $|V_{cv}|$ and the required internal voltage phasor reference angle $\angle V_{CV}$, needed to achieve the seamless transition from current limiting mode 430 to constrained grid-forming mode 450, given a desired reactance-to-resistance ratio for the current limiting $$r_{XR} = \frac{imag(Z_{CVL})}{real(Z_{CVL})},$$

virtual impedance, and given a desired magnitude of current limiting virtual impedance $|Z_{CVL}|$:

$$A = |Z_{CVL}||I_p|$$

$$B = |V_p + V_{CVSS}|$$

$$\angle Z_{CVL} = \tan^{-1}(r_{XR})$$

$$\gamma = \pi - \angle(V_p + V_{CVSS}) + \angle I_p + \angle Z_{CVL}$$

$$C = \left[A^2 + B^2 - 2AB\cos(\gamma)\right]^{0.5}$$

$$\alpha = \pi - \gamma - \sin^{-1}\left(\frac{B}{C}\sin\gamma\right)$$

$$|V_{cv}| = C$$

$$\angle V_{CV} = \angle(V_p + V_{CVSS}) - \alpha$$

In the aforementioned discussion, the virtual impedance is considered to consist of non-salient reactive and resistive elements. That is, any reactance within the virtual impedance is considered to have identical magnitude in the d- and q-channels, and any resistance within the virtual impedance is considered to have identical magnitude in the d- and q-channels. However it is also possible that a salient virtual impedance can be applied in the steady state and, in the constrained GFM mode, for purposes of current limiting. If the virtual impedance is salient, the reactance within the virtual impedance may have a different value in the d-channel than in the q-channel. The same may be true for any resistance within the virtual impedance.

It is mentioned above that the phase angle component of the reference signal 212 can be used as the reference frame of the first data 215 in the first limiting mode 430, or a PLL, FFL, or SOGI, etc. can be employed for this purpose. The same reference frame can be used to calculate the 'orientation-dependant' voltage drop across different d- and q-channel components of the reactance and resistive elements within the virtual impedance.

Application of a salient virtual impedance for current limiting in the constrained GFM mode has potential advantages, in that the voltage drop induced by the current-limiting impedance magnitude can be concentrated mostly (or entirely) in the particular channel that is experiencing the overload. Greater flexibility of operation, and enhanced stabilizing current provision capability, may then be possible in the constrained GFM mode due to presence of the orthogonal low-impedance channel. As in the case of the non-salient current limiting impedance, analytical techniques can be used to compute the d- and q-channel components of the salient reactance and/or resistance that allow a seamless transition from the first limiting mode 430 into the constrained GFM mode 450.

In the aforementioned discussion, it may be assumed that the controller 200 is operating exclusively on positive sequence quantities, and that the method 400 is applied to positive sequence quantities. However, it should be noted that the controller 200 and the control method 400 may also be applied, independently, to the negative sequence, wherein the controller 200 represents a controller that provides negative sequence voltage control functions, possibly comprising cascaded negative sequence voltage control, single-loop negative sequence voltage control, or direct negative sequence voltage control. In this case, the reference signal 212 is typically zero, as zero negative sequence voltage is desired (however, a non-zero negative sequence voltage reference can also be implemented). With respect to the modes in FIG. 4, the modes and mode transitions function in the negative sequence implementation in the same way as for the positive sequence implementation. For example, the first limiting mode 430 may be entered when the measured negative sequence current 222 or some proxy for this current (e.g., current reference or estimated current) exceeds a negative sequence threshold. As in the case of the positive sequence application, a negative sequence virtual impedance can be determined that will allow a seamless transition into the constrained GFM mode for the negative sequence controller. Assuming that both a positive sequence and negative sequence controller exist, the overall control strategy shown in FIG. 4 can optionally be applied simultaneously to both positive and negative sequences (with identical or distinct control parameters), or to just one of the sequences.

In the first constrained grid-forming mode 450, the power converter 204 is able to regulate the power converter 204 output voltage, and thereby continue to support the grid 232. Signals and controllers that had been frozen or disabled in limit mode 430 are reactivated in constrained GFM mode 450, and, if necessary, re-initialized at a value that does not disturb the system equilibrium during the transition from limit mode 430 to constrained GFM mode 450. The controller 200 controls the power converter 204 in the first constrained grid-forming mode 450 within 50 ms of controlling the power converter 204 in the limiting mode 430. This tends to reduce or minimise the amount of time the power converter 204 is in a GFL mode, which tends to allow the power converter 204 to rapidly return, in an electromechanical timescale, to a GFM mode whereby the power converter 204 can continue to support the grid 232.

Figure 7:
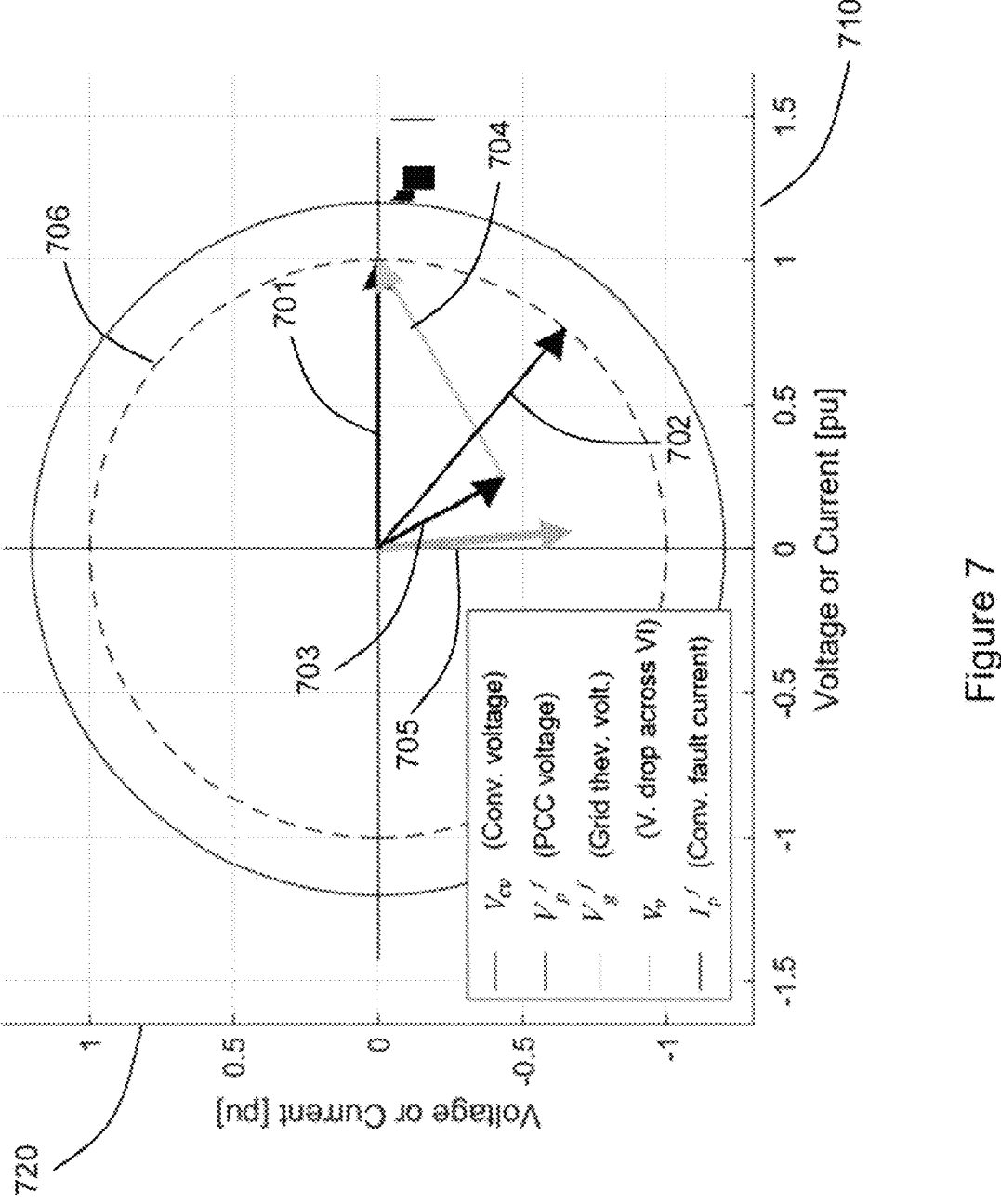
FIG. 7 is a schematic illustration (not to scale) of a phasor diagram showing phasors during the first constrained grid-forming mode.

With reference to FIG. 7, a phasor diagram 700 illustrates, in a simulated result of the first constrained grid-forming mode 450, the internal voltage phasor reference $V_{cv}$ as a first phasor 701, the faulted output current $I_p^f$ of the power converter 204 in the equilibrium condition as a second phasor 702, the node voltage (faulted coupling voltage) $V_p^f$ as a third phasor 703, the virtual voltage $V_v$ as a fourth phasor 704, and the faulted Thevenin voltage phasor $V_g^f$ of the grid 232 as a fifth phasor 705. The phasor diagram 700 also includes an x-axis 710 and a y-axis 720, each having a unit of voltage or current (per unit). Also shown is the first threshold as a first limit 706.

In the example shown in FIG. 7, the controller 200 determines that the first parameter exceeds the first threshold by determining that a phasor current has reached a phasor current limit. The first parameter is thus the second phasor 702, and the first threshold is the first limit 706.

As can be seen in FIG. 7, the fifth phasor 705 is less than 1 p.u. which shows that there has been a grid event on the grid 232. The faulted output current $I_p^f$ of the power converter 204, shown as the second phasor 702, is at the first limit 706. The fourth phasor 704 is the difference between the first phasor 701 and third phasor 703. The power converter 204 is thus controlled in the first constrained grid-forming mode 450, wherein the faulted output current $I_p^f$ of the power converter 204 is maintained in the equilibrium condition (as shown by the second phasor 702), as a result of the virtual voltage $V_v$ used to determine the virtual impedance $Z_{cv}$, which is used to determine the adjustment term for the control system 228.

The adjustment term, in one embodiment, could comprise the fourth phasor 704 (the virtual voltage $V_v$), which can be defined as the product of the impedance phasor $Z_{cv}$ and the measured current phasor $I_p^f$. In another embodiment, the adjustment term could instead comprise the product of the impedance phasor $Z_{cv}$ and the current phasor reference contained in the first data 215. The adjustment term, in one embodiment, could be applied as a virtual voltage that is summed with the internal voltage phasor reference 212, which modifies the reference provided to the voltage controller 214 (or, in the case that a direct voltage regulation or single-loop voltage regulation controller is used, 214B) so that the voltage controller appropriately realizes the virtual voltage drop as it performs its control action.

The controller 200 is further able to provide a smooth transition to return from the first constrained grid-forming mode 450 to the initial grid-forming mode 410. Prior to this smooth transition, as the grid event clears and the current $I_p^f$ reduces, the third phasor 703 returns towards the first phasor 701. Because the fourth phasor 704 (the virtual voltage $V_v$) is the difference between the first phasor 701 and the third phasor 703, the fourth phasor 704 will consequently become smaller in magnitude as the grid event clears.

After the grid event clears, once the virtual voltage $V_v$ is sufficiently small and the system is determined to be in equilibrium, an action can be taken to initiate a smooth, controlled transition from the first constrained grid-forming mode 450 to the initial grid-forming mode 410. As such, the component of the virtual impedance $Z_{cv}$ added by the controller 200 for current limiting, and the associated adjustment term, will then converge towards zero. Thus, during the controlled transition, the controller 200 may further reduce the adjustment term 490 in the modified control system 228 beyond the reduction that had already occurred at the clearing of the grid event, eventually reducing the modification to zero, and thereby returning to control the power converter 204 in the grid-forming mode 410.

This advantageously tends to allow the power converter 204 to smoothly return to normal grid-forming control, without any disruptions to the grid 232 as a result of controlling the power converter 204. Additionally, the power converter 204 tends to be able to maintain some form of grid-forming control, to support the power converter 204 during the grid event.

In some embodiments, the controller 200 may determine 460 that a second parameter related to the controller 200 and/or the power converter 204 exceeds a second threshold.

Responsive to determining that the second parameter exceeds the second threshold, the controller controls the power converter 204 in a second limiting mode, by limiting the power converter 204 output current 222 based on an updated present value or an updated reference value (or, in the case that a direct voltage regulation or single-loop voltage regulation controller is used, the limiting controller 217 will limit the output current 222 to an updated present value or an updated reference value). As a result, the control data 230 is expected to rapidly manipulate the fundamental-frequency voltage waveform at the poles of the power converter 204 such that the measured current 222 conforms to the updated present value or the updated reference value. Absent further grid events during the time period spent in the second limit mode, the control data 230 will also reach a steady state and is not expected to substantially change. Optionally, the control system 228 may be disabled from determining values for control data 230 based on the measured signals 222, 224 and the reference signal 212. The controller 200 then determines an updated output current 222 of the power converter 204.

Responsive to the updated output current 222 reaching an equilibrium condition, the controller 200 determines an updated virtual impedance for the power converter 204 based on the updated output current 222 of the power converter 204, and further modifies the control system 228 based on the updated virtual impedance. The determining the updated virtual impedance and further modifying the control system 228 based on the updated virtual impedance is done in the same manner as described above.

The controller 200 then controls the power converter 204 in a second constrained grid-forming mode 450, by the further modified control system 228 determining the control data 230 based on the measured signals 222, 224 and the reference signal 212.

Determining that a second parameter has exceeded a second threshold, and taking responsive action, tends to be useful when, for example, a fault which caused the grid event is followed by either another fault, or an adjustment in another part of the grid 232 as a result of the grid event. There may thus be a subsequent grid event following an initial grid event.

In some embodiments, the control system 228 is a cascaded control system 228 including a voltage controller 214 and a current controller 216. The voltage controller 214 uses a voltage control system to produce first data 215, based on the reference signal 212 and the measured signals 222, 224, and outputs the first data 215 to the current controller 216. The current controller 216 uses a current control system to produce second data, based on the first data 215 and the measured signals 222, 224.

The current controller 216 may produce the second data relatively faster than the voltage controller 214 produces the first data 215.

The controller 200 determines the control data 230 based on the second data.

The controller 200 controls the power converter 204 in the first limiting mode 430 by setting the first data 215 to be equal to the present value or the reference value, thereby limiting the power converter 204 output current 222, as discussed above.

The modifying of the control system 228 based on the virtual impedance or updated virtual impedance may comprise modifying the voltage control system of the voltage controller 214.

In some embodiments, responsive to the controller 200 controlling the power converter 204 in the first limiting mode 430, the controller may revert the control method back to the initial grid-forming mode 410, if the duration of the first parameter exceeding the first threshold is less than a defined minimum duration.

The method and controller of this disclosure tend to be able to maintain a grid-forming control, to the maximum extent possible, because use of the grid-following mode is kept as brief as possible. The controller and method tend to generally provide stable behaviour during a fault recovery, and furthermore prevent loss-of-synchronism between the grid-forming resource (i.e., the power converter 204) and the bulk power grid (i.e., the grid 232). The controller and method tend to maximize the current capability of the power converter 204, and allow for prioritization of active vs. reactive current, angle vs. voltage, positive vs. negative sequence through the determination of the adjustment term.

Exact implementation of the first parameter can be determined by a user, therefore, the controller and method tend to offer some flexibility and tunability as desired (e.g., the controller and method can be configured to prioritize grid-forming behaviour, or for allow for extended current limitation, etc.).

We claim:

1. A method for controlling a power converter connected to a grid, wherein the power converter is initially controlled in a grid-forming mode to output current at a nominal voltage, based on control data provided by a controller, the controller comprising a control system which determines the control data based on measured signals indicative of currents and/or voltages downstream from the power converter, and a reference signal; the method comprising:

determining, by the controller, that a first parameter related to the controller and/or the power converter exceeds a first threshold;

responsive to determining that the first parameter exceeds the first threshold:

controlling, by the controller, the power converter in a first limiting mode, by limiting the power converter output current based on a present value and/or a reference value;

determining, by the controller, the output current of the power converter;

responsive to determining that the output current is at or is close to an equilibrium condition:

determining, by the controller, a virtual impedance for the power converter based on the output current of the power converter;

modifying, by the controller, the control system based on the virtual impedance; and controlling, by the controller, the power converter in a first constrained grid-forming mode, comprising the modified control system determining the control data based on measured signals indicative of currents and/or voltages downstream from the power converter, and a reference signal.

2. The method of claim 1, further comprising:

determining, by the controller, that a second parameter related to the controller and/or the power converter exceeds a second threshold;

responsive to determining that the second parameter exceeds the second threshold:

controlling, by the controller, the power converter in a second limiting mode, by limiting the power converter output current based on an updated present value and/or an updated reference value;

determining, by the controller, an updated output current of the power converter;

responsive to determining that the updated output current is at or is close to an equilibrium condition:

determining, by the controller, an updated virtual impedance for the power converter based on the updated output current of the power converter;

further modifying, by the controller, the control system based on the updated virtual impedance; and controlling, by the controller, the power converter in a second constrained grid-forming mode, comprising the further modified control system determining the control data based on the measured signals indicative of currents and/or voltages downstream from the power converter, and the reference signal.

3. The method of claim 1, wherein the control system is a cascaded control system including a voltage controller and a current controller; wherein the voltage controller uses a voltage control system to produce first data, based on the reference signal and the measured signals, and outputs the first data to the current controller;

the current controller uses a current control system to produce second data, based on the first data and the measured signals;

the controller determines the control data based on the second data; and the controller controls the power converter in the first limiting mode by setting the first data to be equal to the present value and/or the reference value, thereby limiting the power converter output current.

4. The method of claim 1, wherein the control system is a direct voltage controller;

the controller comprises a limiting controller; and the controller controls the power converter in the first limiting mode by the limiting controller restricting the output current of the power converter from increasing past the present value or the reference value, thereby limiting the power converter output current.

5. The method of claim 1, wherein the determining, by the controller, the virtual impedance for the power converter further comprises determining, by the controller, the virtual impedance and a fixed virtual voltage offset for the power converter based on the output current of the power converter; and the modifying, by the controller, the control system based on the virtual impedance further comprises modifying, by the controller, the control system based on the virtual impedance and the fixed virtual voltage offset.

6. The method of claim 1, wherein the modifying of the control system based on the virtual impedance comprises:

determining, by the controller, an adjustment term for the control system by calculating a virtual voltage or a virtual current as a function of the virtual impedance and the output current; and implementing, by the controller, the adjustment term into the control system.

7. The method of claim 1, wherein the controller determines the virtual impedance by:

calculating, whilst the power converter is in the first limiting mode, a virtual voltage defined as a voltage difference between an internal voltage phasor reference for the power converter and a node voltage at a node between an output of the power converter and the grid; and based on a Thevenin equivalent circuit of the power converter connected to the grid, including the virtual voltage, the output current of the power converter in the equilibrium condition, and the virtual impedance, using circuit analysis methods to resolve the Thevenin equivalent circuit for the virtual impedance.

8. The method of claim 7, further comprising:

reducing, by the controller, the virtual impedance, as a result of the voltage difference between the internal voltage phasor reference for the power converter and the node voltage at the node reducing in magnitude, and thereby returning to control the power converter in the initial grid-forming mode.

9. The method of claim 1, wherein a time period from determining that the first parameter related to the controller and/or the power converter exceeds the first threshold, to the controller completing the step of controlling the power converter in the first liming mode, is less than or equal to 50 ms.

10. The method of claim 1, wherein the determining that the first parameter related to the controller and/or power converter exceeds the first threshold comprises one or more of:

determining that a current reference of a dq-frame current regulator using commanded angle or Phase Locked Loop, PLL, angle has saturated; and/or determining that a d or q current reference inputted into a Proportional Integral, PI, controller in a current controller has saturated; and/or determining that a d or q current reference to be inputted, following an inverse reference frame transformation, into a Proportional Resonant, PR, controller in a current controller has saturated; and/or determining that a d or q current reference to be inputted, following an inverse reference frame transformation, into a deadbeat controller in a current controller has saturated; and/or determining that a phasor current limit has been reached; and/or determining that an active power limit has been reached; and/or determining that an energy limit has been reached; and/or determining that a component is pulse dropping or blocking; and/or determining that a voltage reference has saturated; and/or determining that a voltage output has reached a limit; and/or determining that a modulation index has saturated.

11. A controller for controlling a power converter connected to a grid, the controller comprising:

a control system arranged to determine control data based on measured signals indicative of currents and/or voltages downstream from the power converter, and a reference signal;

wherein the controller is arranged to control the power converter in a grid-forming mode to output current at a nominal voltage, based on the control data; and wherein the controller is configured to:

determine that a first parameter related to the controller and/or the power converter exceeds a first threshold;

responsive to determining that the first parameter exceeds the first threshold:

control the power converter in a first limiting mode, wherein the controller is configured to limit the power converter output current based on a present value and/or a reference value;

determine the output current of the power converter;

responsive to determining that the output current is at or is close to an equilibrium condition:

determine a virtual impedance for the power converter based on the output current of the power converter;

modify the control system based on the virtual impedance; and control the power converter in a first constrained grid-forming mode, wherein the modified control system is configured to determine the control data based on measured signals of currents and/or voltages downstream from the power converter, and a reference signal.

12. The controller of claim 11, wherein the controller is further configured to:

determine that a second parameter related to the controller and/or the power converter exceeds a second threshold;

responsive to determining that the second parameter exceeds the second threshold:

control the power converter in a second limiting mode, wherein the controller is configured limit the power converter output current based on an updated present value and/or an updated reference value;

determine an updated output current of the power converter;

responsive to determining that the updated output current is at or is close to an equilibrium condition:

determine an updated virtual impedance for the power converter based on the updated output current of the power converter;

further modify the control system based on the updated virtual impedance; and control the power converter in a second constrained grid-forming mode, wherein the further modified control system is configured to determine the control data based on the measured signals and the reference signal.

13. The controller of claim 11, wherein the control system is a cascaded control system comprising a voltage controller and a current controller; wherein the voltage controller is configured to use a voltage control system to produce first data, based on the reference signal and the measured signals, and is further configured to output the first data to the current controller;

the current controller is configured to use a current control system to produce second data, based on the first data and the measured signals;

the controller is further configured to determine the control data based on the second data; and the controller is further configured to control the power converter in the first limiting mode by setting the first data to be equal to the present value or the reference value, thereby limiting the power converter output current.

14. The controller of claim 11, wherein the controller is configured to modify the control system based on the virtual impedance comprises that the controller is configured to determine an adjustment term for the control system by calculating a virtual voltage or a virtual current as a function of the virtual impedance and the output current, and implement the adjustment term into the control system.

15. A power converter comprising:

a DC side for connection to a DC source;

an AC side for connection to a grid; and the controller of claim 11.

\* \* \* \* \*